US012283251B2

(12) United States Patent
Lee et al.

(10) Patent No.: US 12,283,251 B2
(45) Date of Patent: Apr. 22, 2025

(54) DISPLAY DRIVER INTEGRATED CIRCUIT, SYSTEM-ON-CHIP, AND DISPLAY SYSTEM INCLUDING THE SYSTEM-ON-CHIP

(71) Applicant: SAMSUNG ELECTRONICS CO., LTD., Suwon-si (KR)

(72) Inventors: Chang-ju Lee, Suwon-si (KR); Kyoung Hwan Kwon, Suwon-si (KR); Soo Yong Kim, Suwon-si (KR); Sang Hoon Lee, Suwon-si (KR); Jun Ho Huh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,283

(22) Filed: Sep. 14, 2023

(65) Prior Publication Data

US 2024/0185801 A1 Jun. 6, 2024

(30) Foreign Application Priority Data

Dec. 5, 2022 (KR) ........................ 10-2022-0167923

(51) Int. Cl.
*G09G 3/30* (2006.01)
*G09G 3/3275* (2016.01)

(52) U.S. Cl.
CPC ....... *G09G 3/3275* (2013.01); *G09G 2310/08* (2013.01); *G09G 2320/0247* (2013.01);
(Continued)

(58) Field of Classification Search
None
See application file for complete search history.

(56) References Cited

U.S. PATENT DOCUMENTS 5,373,323 A * 12/1994 Kwon ...................... G09G 5/00 348/718
9,286,855 B2 3/2016 Tripathi
(Continued)

OTHER PUBLICATIONS

Communication issued on Mar. 22, 2024 by the European Patent Office in European Patent Application No. 23205345.4.
(Continued)

*Primary Examiner* — Joseph R Haley
(74) *Attorney, Agent, or Firm* — Sughrue Mion, PLLC

(57) ABSTRACT

A display driver integrated circuit, System-On-Chip, and display system including the System-On-Chip are provided. A display driver integrated circuit (IC) includes: a clock generator configured to generate an internal operating clock; and a control circuit configured to provide a data signal to a pixel array based on the internal operating clock, wherein the data signal corresponds to frame data, wherein the control circuit is further configured to, in a frame data update period: receive first frame data, perform a first synchronization operation on the internal operating clock based on the first frame data, and provide a first data signal to the pixel array, and wherein the control circuit is further configured to, in a low power mode (LPM) period when an update of the frame data is not performed: transmit a sync request signal based on a result of monitoring a state of a display panel, receive a frequency signal from a System-on-Chip (SoC) in response to the sync request signal, and perform a second synchronization operation on the internal operating clock based on the frequency signal.

17 Claims, 11 Drawing Sheets

(52) U.S. Cl.
CPC ............... *G09G 2320/0252* (2013.01); *G09G 2330/021* (2013.01); *G09G 2350/00* (2013.01)

(56) References Cited

U.S. PATENT DOCUMENTS

| | | | |
|---|---|---|---|
| 9,472,133 | B2 | 10/2016 | Kim et al. |
| 10,019,968 | B2 | 7/2018 | Bi et al. |
| 10,096,303 | B2 | 10/2018 | Lee et al. |
| 10,366,649 | B2 | 7/2019 | Sung et al. |
| 10,388,246 | B2 | 8/2019 | Jeon |
| 10,891,887 | B2 | 1/2021 | Ansari et al. |
| 11,062,674 | B2 | 7/2021 | Ansari et al. |
| 11,587,531 | B2 * | 2/2023 | Ansari .................. G06F 3/1423 |
| 2011/0115781 | A1 * | 5/2011 | Park ....................... G09G 5/008 345/99 |
| 2012/0146968 | A1 | 6/2012 | Glen |
| 2015/0015591 | A1 | 1/2015 | Oh et al. |
| 2015/0029201 | A1 | 1/2015 | Cha et al. |
| 2015/0294647 | A1 * | 10/2015 | Roh ......................... G09G 5/18 345/214 |
| 2019/0131321 | A1 * | 5/2019 | Yuan ................... H01L 27/1218 |
| 2021/0280148 | A1 | 9/2021 | Liu et al. |
| 2022/0408055 | A1 * | 12/2022 | Ozawa ................... H04N 23/60 |

OTHER PUBLICATIONS

Communication issued on Apr. 8, 2024 by the European Patent Office in European Patent Application No. 23205345.4.

* cited by examiner

DISPLAY DRIVER INTEGRATED CIRCUIT, SYSTEM-ON-CHIP, AND DISPLAY SYSTEM INCLUDING THE SYSTEM-ON-CHIP

CROSS-REFERENCE TO RELATED APPLICATION

This application claims priority to Korean Patent Application No. 10-2022-0167923 filed on Dec. 5, 2022 in the Korean Intellectual Property Office, the content of which is incorporated by reference herein in its entirety.

BACKGROUND

1. Field

The present disclosure relates to a display driver integrated circuit (DDIC), a system-on-chip (SoC), and a display system including the SoC.

2. Description of the Related Art

As the resolution of the displays of portable devices such as smartphones or tablet personal computers (PCs) increases, memory bandwidth requirements and the power consumption of the portable devices also increases.

As low-temperature polycrystalline oxide (LTPO) panels capable of storing data for a long period of time (e.g., one second) have been commercialized, interfaces between application processors (APs) and display driver integrated circuits (DDIC) have been switched from a command mode to a video mode. The improved data retention capability of the LTPO panels can reduce the number of interfaces for a screen update, mitigating the problem of an increased power consumption resulting from the application of video-mode interfacing, and provides advantages of video-mode interfacing, such as fast screen response and reduced manufacturing cost of DDICs.

In the case of driving a display device at low frame rate (LFR), system/interface power may be turned off except for a frame update when an image is output in order to reduce the power consumption of the system. In this case, the display driving frequency of an AP and the display driving frequency of a DDIC may become different, and as a result, flicker may occur on a screen. Therefore, research into ways to address this is needed.

SUMMARY

Example embodiments of the present disclosure provide a display driver integrated circuit (DDIC), a system-on-chip (SoC), and a display system that may reduce flicker that may occur in a display panel due to a rapid synchronization of operating clocks.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an example embodiment, a display driver integrated circuit (IC) includes: a clock generator configured to generate an internal operating clock: and a control circuit configured to provide a data signal to a pixel array based on the internal operating clock, wherein the data signal corresponds to frame data, wherein the control circuit is further configured to, in a frame data update period: receive first frame data, perform a first synchronization operation on the internal operating clock based on the first frame data, and provide a first data signal to the pixel array, and wherein the control circuit is further configured to, in a low power mode (LPM) period when an update of the frame data is not performed: transmit a sync request signal based on a result of monitoring a state of a display panel, receive a frequency signal from a System-on-Chip (SoC) in response to the sync request signal, and perform a second synchronization operation on the internal operating clock based on the frequency signal.

According to an aspect of an example embodiment, a System-on-Chip (SoC) includes: a clock generator configured to generate an internal operating clock; and a control circuit configured to generate and output the frame data based on the internal operating clock, wherein the control circuit is further configured to: transmit first frame data, which is generated based on the internal operating clock, to a display panel, receive a sync request signal from the display panel, and transmit a frequency signal to the display panel based on the internal operating clock, in response to the sync request signal.

According to an aspect of an example embodiment, a display system includes: a System-on-Chip (SoC) configured to: generate, based on a first internal operating clock, frame data, and output the frame data: and a display panel configured to output, based on a second internal operating clock, an image corresponding to the frame data, wherein the display panel is further configured to, in a frame data update period when an update of the frame data is performed: receive first frame data from the SoC, perform a first synchronization operation, which synchronizes the second internal operating clock with the first internal operating clock, based on the first frame data, and output the image corresponding to the first frame data, and wherein the display panel is further configured to, in a low power mode (LPM) period when the update of the frame data is not performed: transmit a sync request signal to the SoC based on a result of monitoring a state of the display panel, receive a frequency signal, which is generated based on the first internal operating clock, from the SoC in response to the sync request signal, and perform a second synchronization operation, which synchronizes the second internal operating clock with the first internal operating clock, based on the frequency signal.

The effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
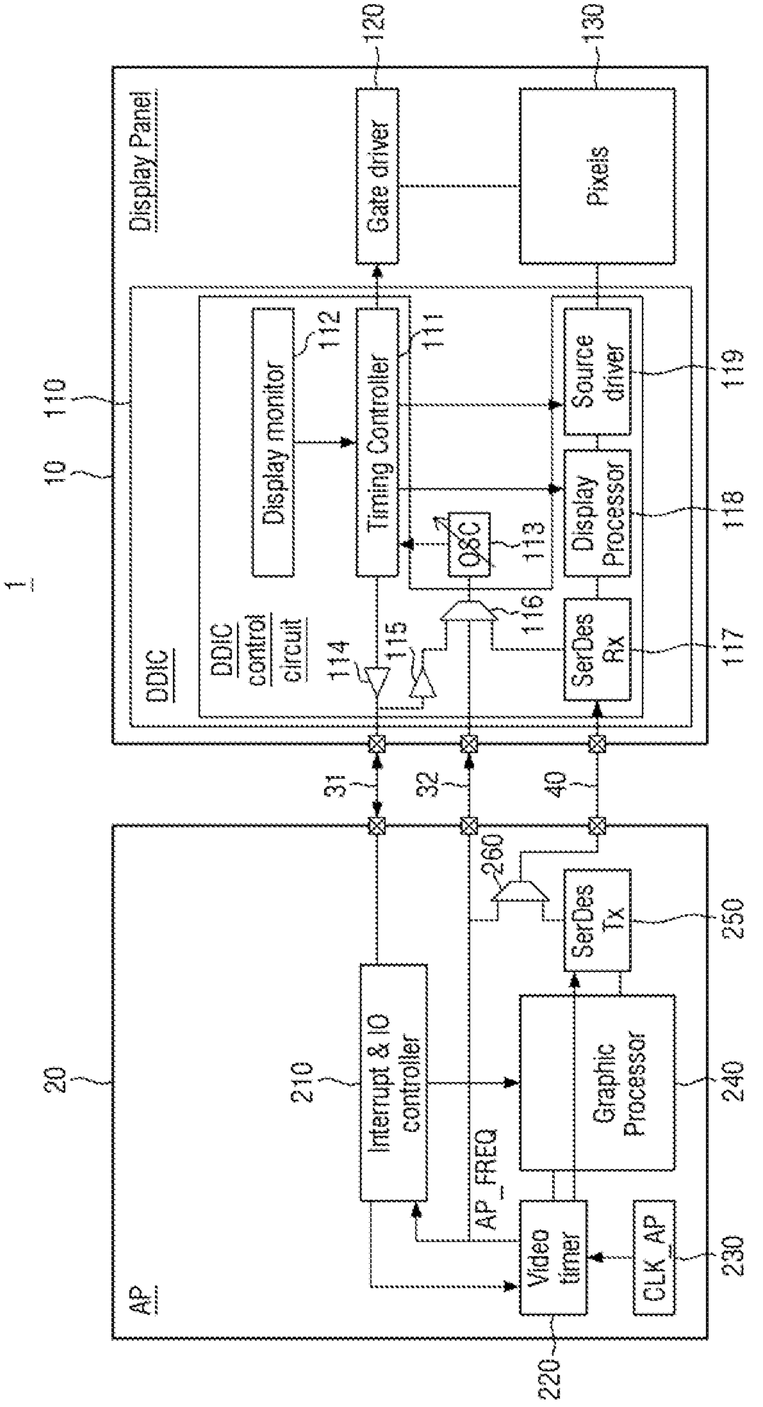
FIG. 1 is a block diagram of a display system including a display panel according to one or more embodiments of the present disclosure.
Figure 2:
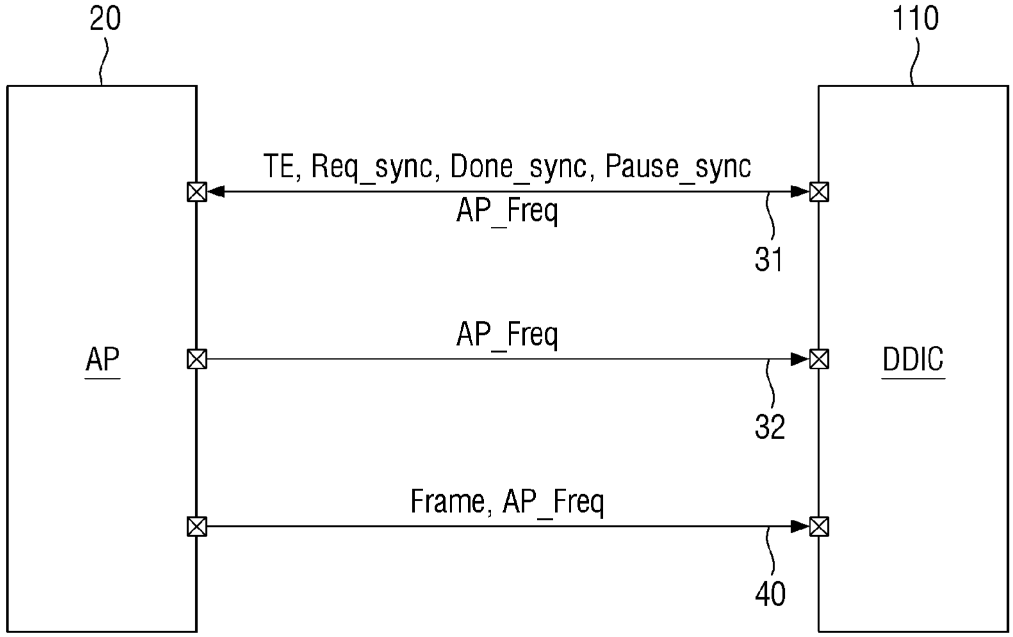
FIG. 2 illustrates first and second side links and a main link of FIG. 1.

FIG. 1 is a block diagram of a display system including a display panel according to one or more embodiments of the present disclosure. FIG. 2 illustrates first and second side links and a main link of FIG. 1.

Referring to FIGS. 1 and 2, a display system 1 includes a system-on-chip (SoC) and a display panel 10. In one or more embodiments, the SoC may include an application processor (AP) 20. The SoC will hereinafter be described as being the AP 20, but embodiments of the present disclosure are not limited thereto.

The display system 1 may be implemented as a television (TV) system, a multiscreen system, or a portable electronic device.

The portable electronic device may be implemented as, for example, a laptop computer, a mobile phone, a smartphone, a tablet personal computer (PC), a personal digital assistant (PDA), an enterprise digital assistant (EDA), a digital still camera, a digital video camera, a portable multimedia player (PMP), a personal (or portable) navigation device (PND), a mobile Internet device (MID), a wearable computer, an Internet-of-Things (IOT) device, an Internet-of-Everything (IoE) device, or an electronic-book (e-book) reader.

The AP 20 may control the display panel 10. The AP 20 may include a control circuit and a clock generator 230. The control circuit of the AP 20 may include an interrupt & input/output (IO) controller 210, a video timer 220, a graphic processor 240, and a signal transmitter 250.

The interrupt & IO controller 210 may provide frame data, which is to be output to the display panel 10, to the DDIC 110 in response to a frame data request signal (e.g., a tearing effect (TE) signal) received from the DDIC 110 via a first side link 31. Here, the frame data request signal will hereinafter be described as being a TE signal.

For example, the interrupt & IO controller 210 may receive the TE signal, which is a type of interrupt signal, from the DDIC 110 via the first side link 31 and may control the graphic processor 240 to provide the frame data to the DDIC 110.

Also, the interrupt & IO controller 210 may receive a sync request signal Req_sync from the DDIC 110 and may control the video timer 220 to transmit an AP frequency signal AP_FREQ to the DDIC 110. AP_FREQ may be sent on first side link 31, second side link 32 or main side link 40, as shown in FIG. 2.

Also, the interrupt & IO controller 210 may receive a sync done signal Done_sync from the DDIC 110 and may recognize that the synchronization of the operating frequency of the DDIC 110 and the operating frequency of the AP 20 is complete.

Also, the interrupt & IO controller 210 may receive a "sync pause" signal Pause_sync from the DDIC 110 and may control the video timer 220 not to transmit the AP frequency signal AP_FREQ any longer to the DDIC 110.

In response to receipt of the sync done signal Done_sync from the DDIC 110, the interrupt & IO controller 210 may recognize that the synchronization of the operating frequency of the DDIC 110 and the operating frequency of the AP 20 is complete, and may control the video timer 220 to continue to provide the AP frequency signal AP_FREQ to the DDIC 110. On the contrary, in response to receipt of the "sync pause" signal Pause_sync from the DDIC 110, the interrupt & IO controller 210 may control the video timer 220 not to transmit the AP frequency signal AP_FREQ any longer to the DDIC 110.

The clock generator 230 may generate a clock necessary for an operation of the AP 20. In one or more embodiments, the clock generator 230 may include an oscillator, but embodiments of the present disclosure are not limited thereto.

The video timer 220 may extract the AP frequency signal AP_FREQ from an output signal of the clock generator 230. The AP frequency signal AP_FREQ may have the same frequency as the output signal of the clock generator 230 or may have a frequency divided from the frequency of the output signal of the clock generator 230. The video timer 220 may provide the AP frequency signal AP_FREQ to the graphic processor 240 such that the graphic processor 240 may provide the frame data to the DDIC 110 in accordance with the AP frequency signal AP_FREQ.

In one or more embodiments, the video timer 220 may provide the AP frequency signal AP_FREQ to the DDIC 110 via the first side link 31 in response to the sync request signal Req_sync from the DDIC 110. Also, in one or more embodiments, the video timer 220 may provide the AP frequency signal AP_FREQ to the DDIC 110 via a second side link 32 in response to the sync request signal Req_sync from the DDIC 110.

Also, in one or more embodiments, the video timer 220 may provide the AP frequency signal AP_FREQ to the DDIC 110 via the multiplexer 260 and a main link 40 in response to the sync request signal Req_sync from the DDIC 110. Also, in one or more embodiments, the video timer 220 may provide the AP frequency signal AP_FREQ directly to the signal transmitter 250 in response to the sync request signal Req_sync from the DDIC 110 such that the AP frequency signal AP_FREQ may be provided to the DDIC 110 via the main link 40.

In one or more embodiments, when the interrupt & IO controller 210 receives the "sync pause" signal Pause_sync from the DDIC 110, the video timer 220 may not transmit the AP frequency signal AP_FREQ any longer to the DDIC 110 under the control of the interrupt & IO controller 210.

The graphic processor 240 may generate the frame data, which is to be output to the display panel 10, and may transmit the frame data to the DDIC 110 via the main link 40. In one or more embodiments, the main link 40 may be a high-bandwidth communication link, compared to the first and second side links 31 and 32. For example, the main link 40 may be a high-bandwidth communication link, and the first and second side links 31 and 32 may be low-bandwidth communication links. In one or more embodiments a link is a wired connection between a first IC chip and a second IC chip. Data may be transferred over a main link and some control signals may be communicated over a side link.

The multiplexer 260 may transmit the output of the graphic processor 240 to the DDIC 110 when the frame data from the graphic processor 240 needs to be transmitted to the DDIC 110, and may transmit the output of the video timer 220 to the DDIC 110 when the AP frequency signal AP_FREQ from the video timer 220 needs to be transmitted to the DDIC 110. FIG. 1 illustrates that the multiplexer 260 selects and outputs the output of the signal transmitter 250 and the AP frequency signal AP_FREQ to the main link 40. The multiplexer 260 may be implemented as hardware, but embodiments of the present disclosure are not limited thereto.

For example, in a case where the signal transmitter 250 includes high- and low-bandwidth drivers, the output of the low-bandwidth driver and the AP frequency signal AP_FREQ may be configured to be input to the multiplexer 260, and the multiplexer 260 may be disposed at the input terminal of the low-bandwidth driver.

The display panel 10 may include the DDIC 110, a gate driver 120, and a pixel array 130. The display panel 10 may not include a graphics random-access memory (GRAM) therein and may operate in a video mode to output the frame data from the AP 20. That is, the timing of the output of an image to the display panel 10 may be determined by the AP 20.

The DDIC 110 may include a control circuit and the clock generator 113. The control circuit of the DDIC 110 may include a timing controller 111, a display monitor 112, buffers 114 and 115, a multiplexer 116, a signal receiver 117, a display processor 118, and a source driver 119. The clock generator 113 of the DDIC 110 may include, for example, an oscillator. The clock generator 113 will hereinafter be described as including an oscillator 133, but embodiments of the present disclosure are not limited thereto.

The timing controller 111 may generate a timing signal in accordance with the frequency of a signal generated by the oscillator 113 and may provide the timing signal to the gate driver 120, the display processor 118, and the source driver 110.

The gate driver 120 may provide a gate signal to the pixel array 130 in accordance with the timing signal. The display processor 118 and the source driver 119 may provide a data signal and an emission signal in accordance with the timing signal. Accordingly, the timing of the provision of the emission signal to the pixel array 130 may be changed by the timing signal generated by the oscillator 113.

The display monitor 112 may monitor the state of the display panel 10 by using a plurality of sensors. Then, if the display panel 10 is determined to be in a state where the internal operating frequency $f_{DDIC}$ of the display panel 10 and the internal operating frequency $f_{AP}$ of the AP 20 may differ from each other, the display monitor 112 may generate the sync request signal Req_sync, which is for synchronizing the internal operating frequencies of the display panel 10 and the AP 20, and transmit the sync request signal Req_sync to the Ap 20.

For example, if the display panel 10 is a low-temperature polycrystalline oxide (LTPO) panel that can be driven at low frame rate (LFR), the display panel 10 may have a low power mode (LPM) not to receive the frame data from the AP 20 via the main link 40. Here, the LFR may be a frequency lower than 60 Hz, for example, 30 Hz, 10 Hz, or 1 Hz.

The occurrence of flicker that may be caused by the LPM will hereinafter be described with reference to FIGS. 3A and 3B.

Figure 3A:
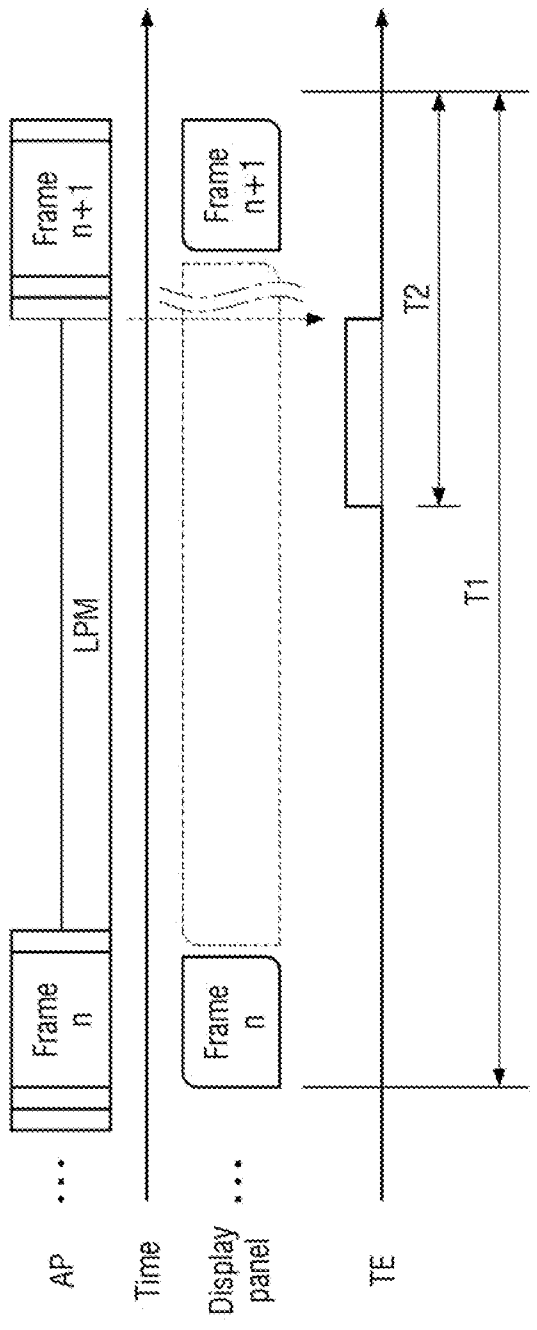
FIG. 3A is a timing diagram for explaining an operation of the display system of FIG. 1.

FIG. 3A is a timing diagram for explaining an operation of the display system of FIG. 1. FIG. 3B is a timing diagram for explaining the occurrence of flicker.

Referring to FIGS. 1 and 3A, a plurality of frames, i.e., n-th and (n+1)-th frames “Frame n” and “Frame n+1” (where n is a natural number), may be transmitted from the AP 20 to the display panel 10.

Each of n-th and (n+1)-th frames “Frame n” and “Frame n+1” may be received together with, for example, a “VBlank”, “VBP”, “VFP”, “VSS”, or “HSS” signal from the Mobile Industry Processor Interface Digital Serial Interface (MIPI DSI), but embodiments of the present disclosure are not limited thereto.

The display panel 10 may receive the n-th and (n+1)-th frames “Frame n” and “Frame n+1” from the AP 20 along a time axis.

The display panel 10 may receive the n-th frame “Frame n” and then the (n+1)-th frame “Frame n+1” from the AP 20 during a first period T1. There may exist an LPM period in which the display panel 10 receives no frame data from the AP 20 via the main link 40, between the period of receipt of the n-th frame “Frame n” and the period of receipt of the (n+1)-th frame “Frame n+1”.

After the receipt of the n-th frame “Frame n”, the display panel 10 may transmit the TE signal to the AP 20 via the first side link 31 at an arbitrary time during the LPM period. For example, the display panel 10 may transmit the TE signal to the AP 20 before a second period T2 for outputting the (n+1)-th frame “Frame n+1”.

For example, the display panel 10 may change the state of the TE signal to a logic high state and may transmit the TE signal to the AP 20. That is, the display panel 10 may transmit the TE signal to the AP 20 to request new frame data to be output to the display panel 10 as the (n+1)-th frame “Frame n+1”.

Figure 3B:
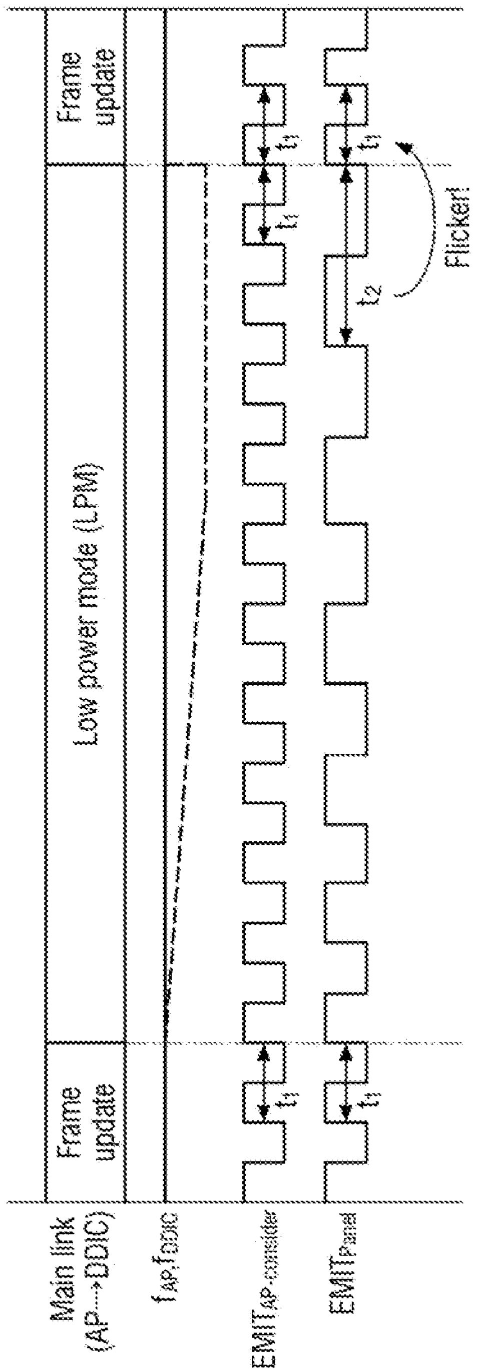
FIG. 3B is a timing diagram for explaining the occurrence of flicker.

Referring to FIGS. 1 and 3B, during a frame update period in which the DDIC 110 receives frame data via the main link 40, an internal operating frequency $f_{AP}$ of the AP 20 and an internal operating frequency $f_{DDIC}$ of the display panel 10 are synchronized using a signal such as “HSYNC” or “VSYNC”. That is, the period of an internal clock may be uniformly maintained to be $t_1$.

When the display panel 10 enters the LPM period, the internal operating frequency $f_{DDIC}$ of the display panel 10 may be changed depending on the state of the display panel 10. In the example of FIG. 3B, the period of the internal clock of the AP 20 may be maintained to be $t_1$, but the period of the internal clock of the display panel 10 may be lengthened to $t_2$.

In a case where for the output of the (n+1)-th frame “Frame n+1”, the display panel 10 transmits the TE signal to the AP 20, receives frame data for outputting the (n+1)-th frame “Frame n+1”, and performs a synchronization operation based on the received frame data to control the period of the internal clock of the display panel 10 to be $t_1$, flicker may occur in the display panel 10 due to a rapid change in the period of the internal clock of the display panel 10.

To prevent the occurrence of flicker, the display monitor 112 may monitor the state of the display panel 10 and may generate the sync request signal Req_sync, which is for synchronizing the internal operating frequency $f_{DDIC}$ of the display panel 10 and the internal operating frequency $f_{AP}$ of the AP 20, and transmit the sync request signal Req_sync to the Ap 20, if the display panel 10 is determined to be in a state where the internal operating frequency $f_{DDIC}$ of the display panel 10 and the internal operating frequency $f_{AP}$ of the AP 20 may differ from each other.

In one or more embodiments, the display monitor 112 may include a temperature sensor and may determine that the display panel 10 is in a state where the internal operating frequency $f_{DDIC}$ of the display panel 10 and the internal operating frequency $f_{AP}$ of the AP 20 may differ from each other, if the temperature of the display panel 10 is at a predetermined level or is within a predetermined range during the LPM period, and may generate the sync request signal Req_sync and transmit the sync request signal Req_sync to the Ap 20.

In one or more embodiments, the display monitor 112 may detect the panel leakage of the display panel 10, may determine that the display panel 10 is in the state where the internal operating frequency $f_{DDIC}$ of the display panel 10 and the internal operating frequency $f_{AP}$ of the AP 20 may differ from each other, if the panel leakage of the display panel 10 is at a predetermined level or is within a predetermined range, and may generate the sync request signal Req_sync and transmit the sync request signal Req_sync to the Ap 20.

In one or more embodiments, the display monitor 112 may store product variation information regarding the display panel 10. Then, if the operating state of the display panel 10 during the LPM period matches the product variation information, the display monitor 112 may determine that the display panel 10 is in the state where the internal operating frequency $f_{DDIC}$ of the display panel 10 and the internal operating frequency $f_{AP}$ of the AP 20 may differ from each other, and may generate the sync request signal Req_sync and transmit the sync request signal Req_sync to the AP 20.

In one or more embodiments, if the display panel 10 is driven at a predetermined frame rate or lower, the display monitor 112 may determine that the display panel 10 is in the state where the internal operating frequency $f_{DDIC}$ of the display panel 10 and the internal operating frequency $f_{AP}$ of the AP 20 may differ from each other, and may generate the sync request signal Req_sync and transmit the sync request signal Req_sync to the AP 20.

The buffer 114 may buffer the TE signal, the sync request signal Req_sync, the sync done signal Done_sync, the "sync pause" signal Pause_sync, which are generated by the timing controller 111, and may transmit the buffered signals to the AP 20. For example, buffering a signal may refer to providing an impedance transformation or circuit isolation from the input of the signal to the buffer to the buffered signal provided at an output of the buffer. The TE signal, the sync request signal Req_sync, the sync done signal Done_sync, the "sync pause" signal Pause_sync are illustrated as being generated by the timing controller 111, but may be generated by other elements or members.

When the AP frequency signal AP_FREQ is received by the DDIC 110 via the first side link 31, the buffer 115 may buffer the AP frequency signal AP_FREQ and may transmit the buffered AP frequency signal to the multiplexer 116.

The multiplexer 116 may transmit the AP frequency signal AP_FREQ, provided by the AP 20, to the oscillator 113 and may allow the frequency of a signal generated by the oscillator 113 to be synchronized with the AP frequency signal AP_FREQ.

The multiplexer 116 may output the output of the buffer 115 when the AP frequency signal AP_FREQ is received by the DDIC 110 via the first side link 31, may output the output of the video timer 220 when the AP frequency signal AP_FREQ is received by the DDIC 110 via the second side link 32, the multiplexer 116, and may output the output of the signal receiver 117 when the AP frequency signal AP_FREQ is received by the DDIC 110 via the main link 40.

Here, the AP frequency signal AP_FREQ may be a differential signal that may be used in a high-speed link or may be a low-speed single-ended signal not using a high-speed transmission circuit. In one or more embodiments, the AP frequency signal AP_FREQ may be, for example, a signal having a HSYNC period, a signal having n times the HSYNC period (where n is a natural number), or a signal having 1/n times the HSYNC period.

The AP 20 and the display panel 10 may communicate with each other in accordance with, for example, the MIPI DSI or the MIPI DIS-2 standards, but embodiments of the present disclosure are not limited thereto. Alternatively, the AP 20 and the display panel 10 may communicate with each other in accordance with the Display Port (DP), embedded DP (eDP), or High-Definition Multimedia Interface (HDMI) standard.

In one or more embodiments, the display panel 10 may be implemented as an adaptive refresh panel (ARP) display panel. Here, the ARP display panel may be a panel capable of storing data for a long period of time, and may include an LTPO panel or hybrid-oxide panel (HOP) panel.

The display panel 10 will hereinafter be described as being an ARP display panel conforming to the MIPI standard (e.g., MIPI DSI-2), but embodiments of the present disclosure are not limited thereto.

During the LPM period, the display panel 10 may transmit the sync request signal Req_sync, which requests internal frequency information of the AP 20, to the AP 20, and the AP 20 may transmit the AP frequency signal AP_FREQ, which includes the internal frequency information of the AP 20, to the display panel 10 in response to the sync request signal Req_sync.

Accordingly, during the LPM period, the display system 1 may synchronize the frequencies of clocks that are not synchronized between the display panel 10 and the AP 20. This will be described later with reference to FIGS. 6A and 6B.

The pixel array 130 may provide a visual screen via the pixels based on frame data received from the AP 20, and this will hereinafter be described with reference to FIGS. 4 and 5.

Figure 4:
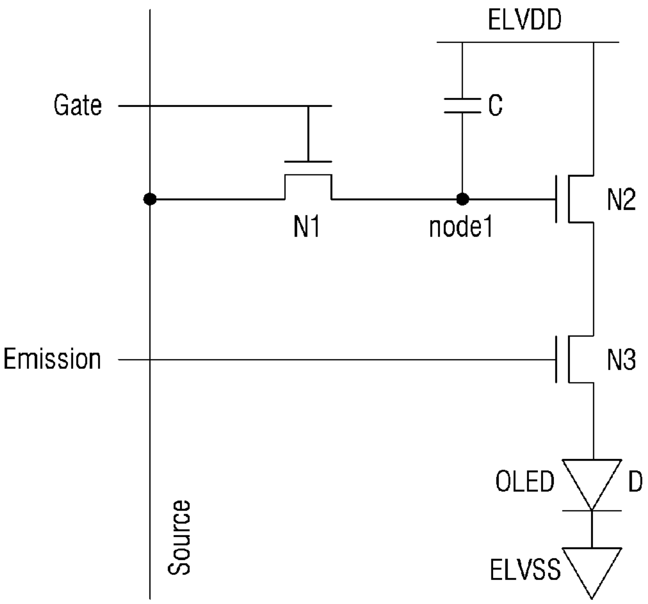
FIG. 4 is a circuit diagram of a pixel included in a pixel array of FIG. 1.

FIG. 4 is a circuit diagram of a pixel included in the pixel array of FIG. 1. FIG. 5 is as timing diagram showing an operation of the pixel of FIG. 4.

FIG. 4 illustrates exemplary circuitry included in each of a plurality of pixels of the pixel array of FIG. 1, but embodiments of the present disclosure are not limited thereto.

Referring to a pixel of FIG. 4, a first transistor N1, which is a switching transistor, may be gated by a gate voltage and may receive a voltage from a drain of the first transistor N1, which is connected to a source of the first transistor N1, and may transmit the received voltage to a first node node1.

A capacitor C may store a data voltage generated using a pixel power supply voltage ELVDD, which is generated based on data received from the controller 110.

A second transistor N2, which is a driving transistor, may be gated by the voltage of the first node node1 and may control the magnitude of a current that flows to an organic light-emitting diode (OLED) due to the difference between the pixel power supply voltage ELVDD and the data voltage.

A third transistor N3 may function as a switching transistor controlling a current flowing from the second transistor N2 to the OLED D. That is, the third transistor N3 may be gated by an emission signal and may provide the current received from the second transistor N2 to the OLED D, thereby allowing the OLED D to emit light in accordance with the data voltage.

The OLED D is connected to a ground voltage ELVSS. The first, second, and third transistors N1, N2, and N3 are illustrated as being N-type metal-oxide semiconductor (NMOS) transistors, but embodiments of the present disclosure are not limited thereto.

Figure 5:
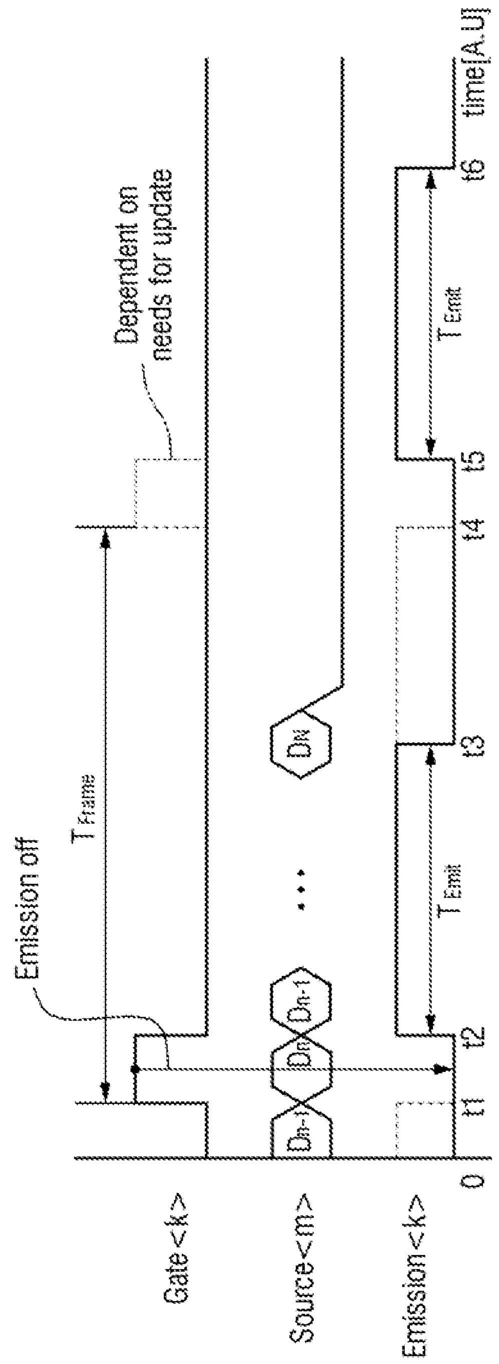
FIG. 5 is as timing diagram illustrating an operation of the pixel of FIG. 4.

Referring to FIGS. 4 and 5, it is assumed that the first transistor N1 is connected to a k-th gate Gate<k>, the third transistor N3 is a k-th emission signal Emission<k>, and the drain of the first transistor N1 is connected to an m-th source Source<m> (where k and m are natural numbers).

For example, the k-th gate Gate<k> may become logic high in a period between a first time t1 and a second time t2, and may also become logic high in a period between a fourth time t4 and a fifth time t5. That is, the first transistor N1 may be turned on at the first time t1, turned off at the second time t2, turned on again at the fourth time t4, and turned off again at the fifth time t5.

The period in which the first transistor N1 is turned on may be defined as a frame period $T_{Frame}$. When turned on at the first time t1, the first transistor N1 may transmit data received from the m-th source Source<m>, for example, n-th data $D_n$, to the first node node1. In the period in which the first transistor N1 transmits the n-th data $D_n$ to the first node node1, the k-th emission signal Emission<k> is logic low. That is, the third transistor N3 is maintained to be off.

At an arbitrary time (e.g., a third time t3) between the second time t2 and a time (e.g., the fourth time t4) when a subsequent frame is received, the k-th emission signal Emission<k> becomes logic high. That is, the period in which the third transistor N3 is turned on, i.e., the period between the second time t2 and the time t3, may be defined as an emission period $T_{Emit}$, and in the emission period $T_{Emit}$, the third transistor N3 may provide the current received from the second transistor N2 to the OLED D, thereby allowing the OLED D to emit light in accordance with a data voltage.

The operation of the pixel of FIG. 4 after the fourth time t4 is substantially the same as the operation of the pixel of FIG. 4 before the fourth time t4, and thus, a detailed description thereof will be omitted. After the fourth time t4, the k-th emission signal Emission<k> operates in the same manner regardless of the occurrence of a frame data update. At the fourth time t4, the k-th gate Gate<k> may be turned on depending on whether the update of new frame data is needed. That is, when the update of new frame data is needed, the k-th gate Gate<k> may be turned on again at the fourth time t4.

As already mentioned above, as no frame data update occurs in the LPM period, the timing of the k-th emission signal Emission<k> is determined by the frequency of the internal operating clock of the display panel 10. On the contrary, if after the LPM period, the frequency of the internal operating clock of the display panel 10 is rapidly changed to match the frequency of the internal operating clock of the AP 20 in response to the update of frame data, the timing of the k-th emission signal Emission<k> may also be rapidly changed, and as a result, flicker may occur on the screen.

Figure 6A:
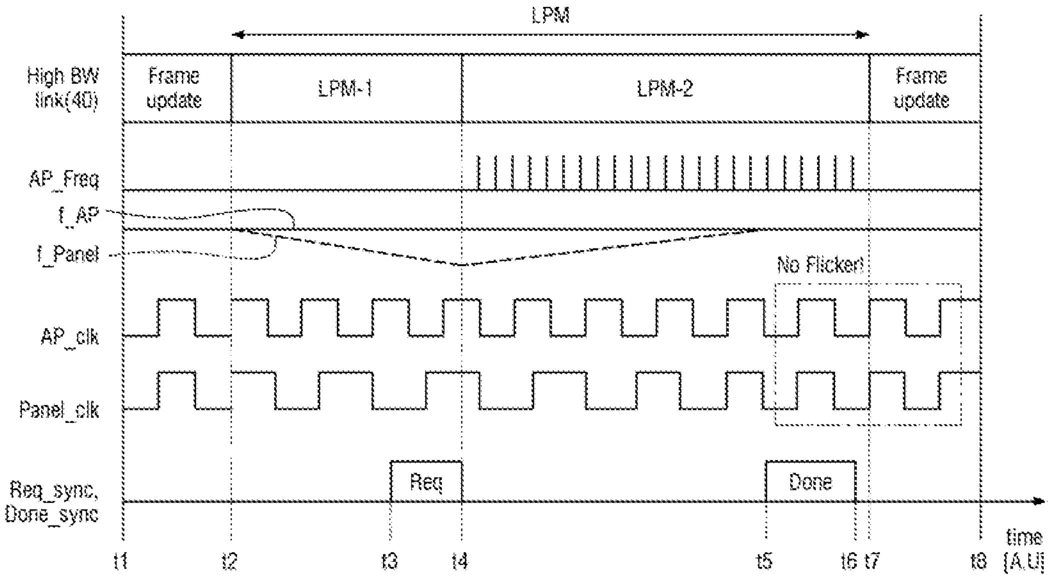
FIG. 6A is a timing diagram illustrating an operation of the display system of FIG. 1.
Figure 6B:
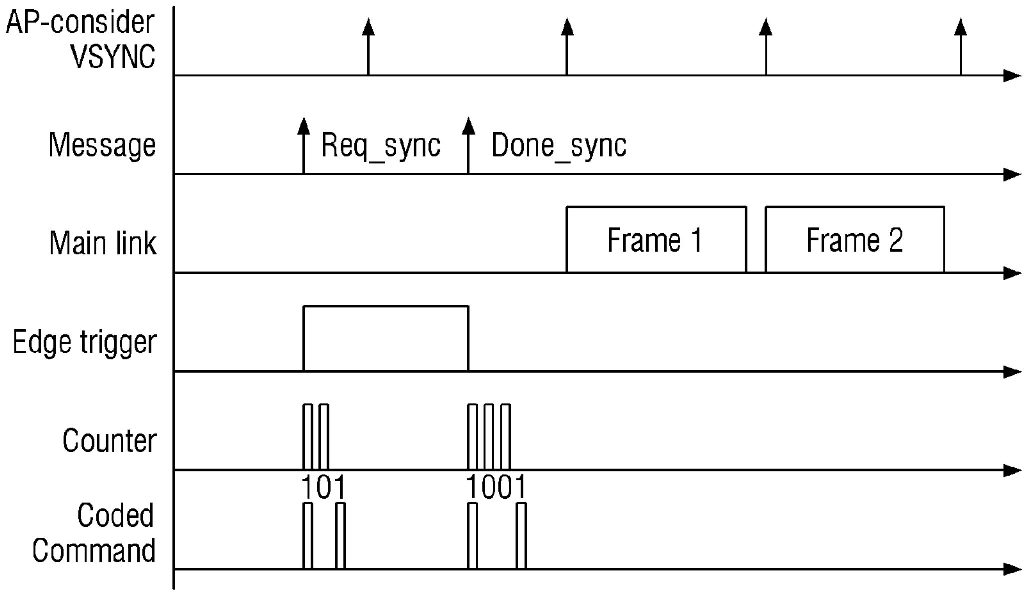
FIG. 6B illustrates how to transmit sync request and sync done signals via the first side link of FIG. 2.

FIG. 6A is a timing diagram illustrating an operation of the display system of FIG. 1. FIG. 6B illustrates how to transmit sync request and sync done signals via the first side link of FIG. 2.

Referring to FIGS. 1 and 6A, the LPM period may be divided into a plurality of sub-LPM periods, for example, first and second sub-LPM periods LPM-1 and LPM-2. The number of sub-LPM periods is not particularly limited.

As already mentioned above, when a frame data update occurs via the main link 40, the synchronization of the frequencies of the internal operating clocks of the AP 20 and the DDIC 110 is continued.

Thereafter, in the LPM period when the transmission of frame data via the main link 40 does not occur, a difference may arise between the internal operating frequency $f_{AP}$ (hereinafter, referred to as a first frequency f_AP) of the AP 20 and the internal operating frequency $f_{DDIC}$ (hereinafter, referred to as a second frequency f_Panel) of the display panel 10 depending on the operating state of the display panel 10.

For example, it may be expected that a difference will begin to arise between the first and second frequencies f_AP and f_Panel, which have been synchronized by a HSYNC or VSYNC signal during a frame data update, at a second time t2, at which the LPM period begins. For example, it may be expected that the first and second frequencies f_AP and f_Panel will begin to differ from each other in the LPM period, depending on the operating conditions of the display panel 10.

FIG. 6A shows that the second frequency f_Panel decreases from the first frequency f_AP, but alternatively, the second frequency f_Panel may increase from the first frequency f_AP.

That is, the period of an internal clock AP_clk of the AP 20 and the period of an internal clock Panel_clk of the display panel 10 may begin to differ from each other at the second time t2.

The first and second frequencies f_AP and f_Panel is expected to begin to differ from each other at the second time t2, at which the LPM period begins, or a predetermined amount of time after the second time t2.

The display monitor 112 of the DDIC 110 may transmit the sync request signal Req_sync to the AP 20 if a difference is determined to arise between the first and second frequencies f_AP and f_Panel depending on the operating state of the display panel 10.

In one or more embodiments, if the DDIC 110 and the AP 20 are determined to have not communicated with each other for more than a predetermined amount of time, the DDIC 110 may transmit the sync request signal Req_sync to the AP 20. Also, in one or more embodiments, the DDIC 110 may transmit the sync request signal Req_sync to the AP 20 whenever a particular operation is initiated in the display panel 10 after the LPM period.

For example, the DDIC 110 may transmit the sync request signal Req_sync to the AP 20 at a third time t3.

The third time t3, at which the display monitor 112 of the DDIC 110 transmits the sync request signal Req_sync, may be when the absolute value of the second frequency f_Panel is expected to exceed a predetermined percentage of the absolute value of the first frequency f_AP.

For example, if the first frequency f_AP is a hertz (Hz) and the predetermined percentage is 3%, the DDIC 110 may transmit the sync request signal Req_sync to the AP 20 at the third time t3, at which the second frequency f_Panel is expected to become 0.97a Hz, via the first side link 31.

After a fourth time t4, at which the transmission of the sync request signal Req_sync is complete, the interrupt & IO controller 210 of the AP 20 may send a request for an interrupt to, for example, a central processing unit (CPU) of the AP 20, in response to the receipt of the sync request signal Req_sync, and may wake up the video timer 220 if the video timer 220 is in a sleep state.

Thereafter, the video timer 220 may transmit an AP frequency signal AP_FREQ corresponding to the first frequency f_AP to the DDIC 110.

In one or more embodiments, the video timer 220 may transmit the AP frequency signal AP_FREQ to the DDIC 110 via the first side link 31, which receives a TE signal. Also, in one or more embodiments, the video timer 220 may transmit the AP frequency signal AP_FREQ to the DDIC 110 via the second side link 32. Also, in one or more embodiments, the video timer 220 may transmit the AP frequency signal AP_FREQ to the DDIC 110 via the main link 40.

The DDIC 110 may perform a synchronization operation for synchronizing its internal operating clock with the AP frequency signal AP_FREQ, in response to the receipt of the AP frequency signal AP_FREQ. Then, if the difference between the first and second frequencies f_AP and f_Panel is determined to have been reduced or eliminated, the DDIC 110 may transmit the sync done signal Done_sync to the AP 20.

For example, the DDIC 110 may transmit the sync done signal Done_sync to the AP 20 at a fifth time t5.

The fifth time t5, at which the DDIC 110 transmits the sync done signal Done_sync, may be when the DDIC 110 determines that the absolute value of the second f_Panel is below the predetermined percentage of the absolute value of the first frequency f_AP. Here, the sync done signal Done_sync may be transmitted via the first side link 31.

Referring to FIG. 6B, in one or more embodiments, the DDIC 110 may transmit the sync request signal Req_sync and the sync done signal Done_sync to the AP 20 via the first side link 31 in an edge trigger method. For example, the DDIC 110 may transmit the sync request signal Req_sync and the sync done signal Done_sync to the AP 20 via the first side link 310 by changing the sync request signal Req_sync to a logic high state when transmitting the sync request signal Req_sync to the AP 20 and changing the sync done signal Done_sync to a logic low state when transmitting the sync done signal Done_sync.

In one or more embodiments, the DDIC 110 may transmit the sync request signal Req_sync and the sync done signal Done_sync to the AP 20 via the first side link 31 in a counter method. For example, the DDIC 110 may transmit the sync request signal Req_sync and the sync done signal Done_sync to the AP 20 via the first side link 31 by transmitting f pulse signals (where f is a natural number) when to transmit the sync request signal Req_sync and transmitting g pulse signals (where g is a different natural number from f) when to transmit the sync done signal Done_sync.

In one or more embodiments, the DDIC 110 may transmit the sync request signal Req_sync and the sync done signal Done_sync to the AP 20 via the first side link 31 in a coded command method. For example, the DDIC 110 may transmit the sync request signal Req_sync and the sync done signal Done_sync to the AP 20 via the first side link 31 by transmitting a signal corresponding to a value of 101 when to transmit the sync request signal Req_sync and transmitting a signal corresponding to a value of 1001 when to transmit the sync done signal Done_sync.

After a sixth time t6, at which the transmission of the sync done signal Done_sync from the DDIC 110 to the AP 20 is complete, the AP 20 may recognize that the synchronization of the display panel 10 is complete, but may continue to transmit the AP frequency signal AP_FREQ.

As the LPM period includes a sub-LPM period (e.g., the second sub-LPM period LPM-2) when the synchronization of the internal clocks of the display panel 10 and the AP 20 is being performed, a rapid synchronization of the internal clocks of the display panel 10 and the AP 20 may not be performed at a seventh time t7, at which a frame data update begins, after the LPM period.

Figure 7:
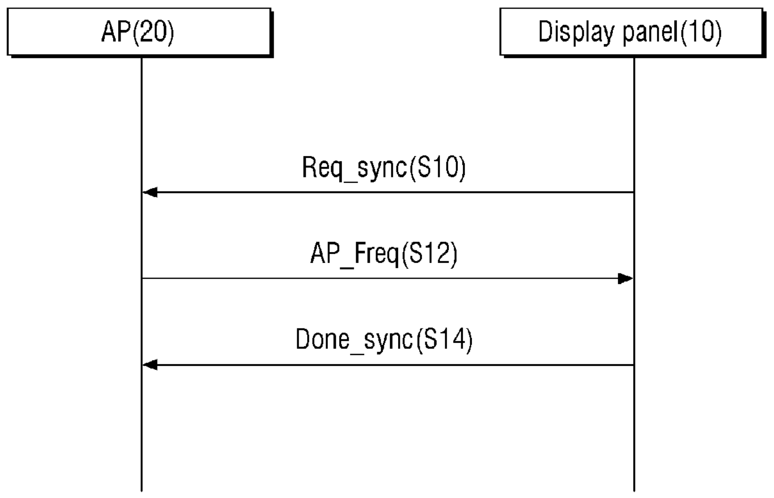
FIG. 7 is a ladder diagram illustrating an operation of the display system according to one or more embodiments of the present disclosure.

FIG. 7 is a ladder diagram illustrating an operation of the display system according to one or more embodiments of the present disclosure.

Referring to FIGS. 1, 6A, and 7, the display panel 10 (e.g., the DDIC 110 of the display panel 10) transmits the sync request signal Req_sync to the AP (S10) if a difference is expected to arise between the first and second frequencies f_AP and f_Panel, which are the operating frequencies of the AP 20 and the display panel 10, respectively, depending on the operating state of the display panel 10.

Thereafter, the application processor 20 transmits an AP frequency signal AP_FREQ for the first frequency f_AP to the display panel 10 (S12).

Thereafter, the display panel 10 performs a synchronization operation based on the AP frequency signal AP_FREQ and transmits the sync done signal to the AP 20 (S14) if it is determined that the difference between the first and second frequencies f_AP and f_Panel has been eliminated or reduced.

Figure 8:
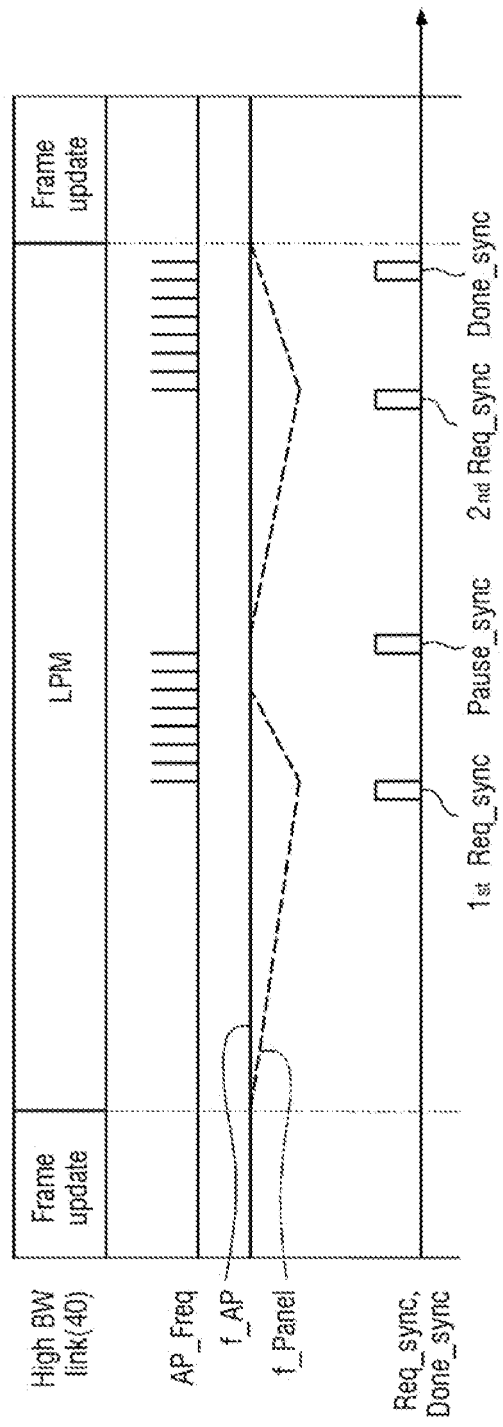
FIG. 8 is a timing diagram illustrating an operation of the display system according to one or more embodiments of the present disclosure.

FIG. 8 is a timing diagram illustrating an operation of the display system according to one or more embodiments of the present disclosure.

The embodiment of FIG. 8 will hereinafter be described, focusing mainly on the differences with the previous embodiments.

Referring to FIGS. 1 and 8, in an LPM period, a plurality of sync request signals, i.e., first and second sync request signals "1st Req_sync" and "2nd Req_sync", may be transmitted from the display panel 10 to the AP 20.

In this manner, the driving frequency of the display panel 10 can be stably maintained not to differ from the driving frequency of the AP 20 by more than a predetermined amount in the LPM period, and this helps maintain an excellent image quality even in the LPM period. The number of sync request signals transmitted by the display panel 10 is not particularly limited.

For example, in the LPM period, the DDIC 110 may generate the first and second sync request signals "1st Req_sync" and "2nd Req_sync" depending on the operating state of the display panel 10.

For example, the DDIC 110 may transmit the first sync request signal "1st Req_sync" to the AP 20 in anticipation that a difference will arise between a first frequency f_AP, which is the internal operating frequency of the AP 20, and a second frequency f_Panel, which is the internal operating frequency of the display panel 10, because the display panel 10 is driven at a predetermined frame rate or lower in the LPM period.

Thereafter, the DDIC 110 may perform a synchronization operation by receiving an AP frequency signal AP_FREQ, and may transmit a "sync pause" signal Pause_sync to the AP 20 when the synchronization operation is complete.

In response to the receipt of the "sync pause" signal Pause_sync, the AP 20 may not transmit the AP frequency signal AP_FREQ any longer to the DDIC 110.

Thereafter, the DDIC 110 may transmit the second sync request signal "2nd Req_sync" to the AP 20 in anticipation that a difference will arise between the first and second frequencies f_AP and f_Panel because the temperature of the display panel 10 will reach a predetermined level or be beyond a predetermined range in the LPM period.

Thereafter, the DDIC 110 may perform a synchronization operation by receiving an AP frequency signal AP_FREQ, and may transmit a sync done signal Done_sync to the AP 20 when the synchronization operation is complete.

In response to the receipt of the sync done signal Done_sync, the AP 20 may recognize that the synchronization with the DDIC 110 is complete, but may continue to transmit the AP frequency signal AP_FREQ to the DDIC 110.

Figure 9:
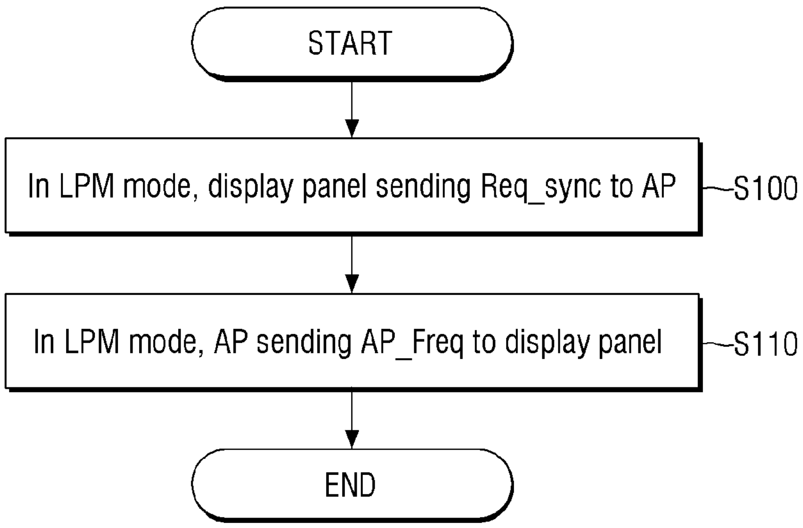
FIG. 9 is a flowchart illustrating an operation of the display system according to one or more embodiments of the present disclosure.

FIG. 9 is a flowchart illustrating an operation of the display system according to one or more embodiments of the present disclosure.

Referring to FIGS. 1, 6A, 8 and 9, the display panel 10 may transmit a sync request signal Req_sync to the AP 20 (S100) if a difference is expected to arise between first and second frequencies f_AP and f_Panel, which are the operating frequencies of the AP 20 and the display panel 10, respectively.

After the transmission of the sync request signal Req_sync, the AP 20 may transmit an AP frequency signal AP_FREQ corresponding to operating frequency information of the AP 20, i.e., an AP frequency signal AP_FREQ corresponding to the first frequency f_AP, to the display panel 10 (S110).

Figure 10:
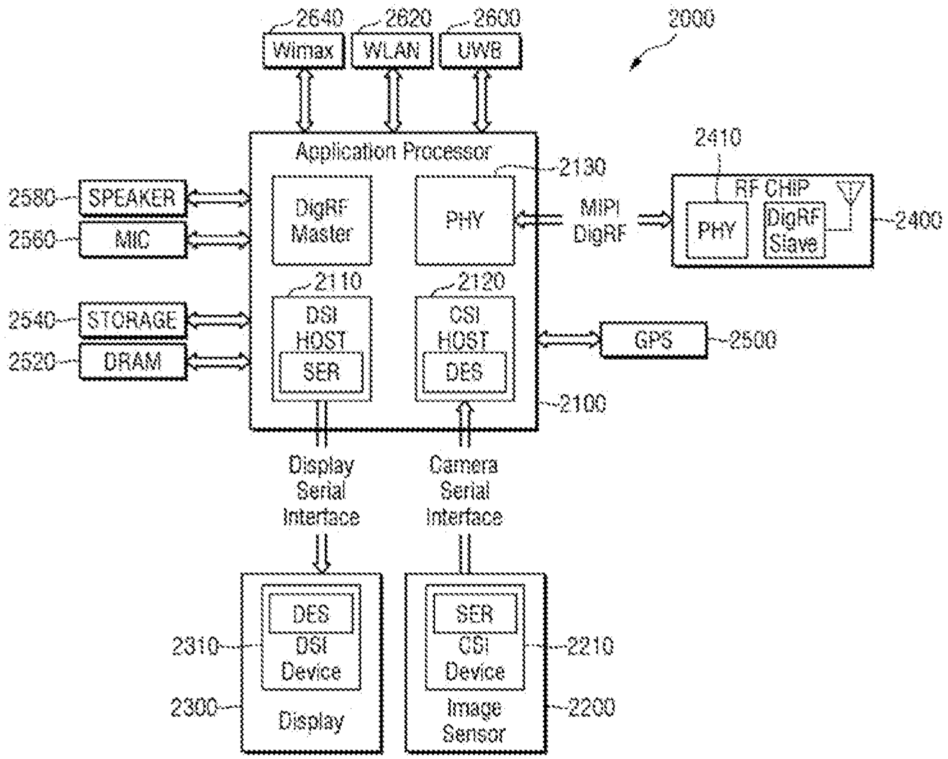
FIG. 10 is a block diagram of an image data processing system according to one or more embodiments of the present disclosure.

FIG. 10 is a block diagram of an image data processing system according to one or more embodiments of the present disclosure.

Referring to FIG. 10, an image data processing system 2000 may be implemented as a portable device such as a personal digital assistant (PDA), a portable media player (PMP), a mobile phone, a smartphone, or a tablet personal computer (PC) capable of using or supporting a vide mode interface such as MIPI®, eDP, or HDMI.

The image data processing system 2000 may include an AP 2100, an image sensor 2200, and a display 2300.

The AP 2100 may correspond to the AP 20 described above with reference to FIGS. 1 through 9, and the display 2300 may correspond to the display panel 10 described above with reference to FIGS. 1 through 9.

A Camera Serial Interface (CSI) host 2120, which is implemented in the AP 2100, may serial-communicate with a CSI device 2210 of the image sensor 2200 via a CSI. A deserializer DES may be implemented in the CSI host 2120, and a serializer SER may be implemented in the CSI device 2210.

A Display Serial Interface (DSI) host 2110, which is implemented in the AP 2100, may serial-communicate with a DSI device 2310 of the display 2300 via a DSI. A serializer SER may be implemented in the DSI host 2110, and a deserializer DES may be implemented in the DSI device 2310.

The image data processing system 2000 may further include a radio frequency (RF) chip 2400, which can communicate with the AP 2100. A physical (PHY) layer 2130 of the image data processing system 2000 and a PHY layer 2410 of the RF chip 2400 may exchange data with each other in accordance with the MIPI DigRF protocol.

The image data processing system 2000 may include a Global Positioning System (GPS) receiver 2500, a memory 2520 such as a dynamic random-access memory (DRAM), a storage device 2540, which is implemented as a nonvolatile memory such as a NAND flash memory, a microphone 2560, and a speaker 2580.

The image data processing system 2000 may communicate with an external device using at least one communication protocol (or standard) such as, for example, ultrawideband (UWB) 2600, Wireless Local Area Network (WLAN) 2620, Worldwide Interoperability for Microwave Access (WiMAX) 2640, or Long-Term Evolution™ (LTE).

In concluding the detailed description, those skilled in the art will appreciate that many variations and modifications may be made to the example embodiments without substantially departing from the principles of the present disclosure. Therefore, the disclosed example embodiments of the present disclosure are used in a generic and descriptive sense only and not for purposes of limitation.

What is claimed is:

1. A display driver integrated circuit (IC) comprising:

a clock generator configured to generate an internal operating clock; and a control circuit configured to provide a data signal to a pixel array based on the internal operating clock, wherein the data signal corresponds to frame data, wherein the control circuit is further configured to, in a frame data update period:

receive first frame data, perform a first synchronization operation on the internal operating clock based on the first frame data, and provide a first data signal to the pixel array for display of an image, and wherein the control circuit is further configured to, in a low power mode (LPM) period when an update of the frame data is not performed:

transmit a sync request signal based on a result of monitoring a state of a display panel, receive a frequency signal from a System-on-Chip (SoC) in response to the sync request signal, and perform a second synchronization operation on the internal operating clock based on the frequency signal, whereby the display driver IC is configured to determine a frequency difference has occurred between a panel clock and a processor clock during a first portion of the LPM period, and update a frequency of the panel clock to synchronize with the processor clock during a second portion of the LPM period, and thereby eliminate a flicker in the image at a time of a frame update, wherein the panel clock is the internal operating clock, the processor clock is the frequency signal from the SoC, and the sync request signal is sent based on the determination of the frequency difference.

2. The display driver IC of claim 1, wherein the control circuit is further configured to, in the frame data update period:

transmit a frame data request signal via a side link, and receive the first frame data via a main link in response to the frame data request signal, and wherein the control circuit is further configured to, in the LPM period:

transmit the sync request signal via the side link, receive the frequency signal via the side link, and transmit a sync done signal via the side link after the second synchronization operation is complete.

3. The display driver IC of claim 2, wherein the side link comprises a low-bandwidth communication link, and wherein the main link comprises a high-bandwidth communication link.

4. The display driver IC of claim 3, wherein the side link comprises a first side link and a second side link, and wherein the control circuit is further configured to:

transmit the frame data request signal, the sync request signal, and the sync done signal via the first side link, and receive the frequency signal via the first side link.

5. The display driver IC of claim 3, wherein the side link comprises a first side link and a second side link, and wherein the control circuit is further configured to:

transmit the frame data request signal, the sync request signal, and the sync done signal via the first side link, and receive the frequency signal via the second side link.

6. The display driver IC of claim 1, wherein the control circuit is further configured to:

transmit, during the frame data update period and via the side link, a frame data request signal, receive the first frame data via a main link in response to the frame data request signal, transmit, during the LPM period and via the side link, the sync request signal, receive, via the main link, the frequency signal, and transmit, via the side link after the second synchronization operation is complete, a sync done signal.

7. The display driver IC of claim 1, wherein the control circuit is further configured to transmit a sync done signal after the second synchronization operation is complete, and the sync request signal and the sync done signal are transmitted in an edge trigger method.

8. The display driver IC of claim 1, wherein the control circuit is further configured to transmit a sync done signal after the second synchronization operation is complete, and the sync request signal and the sync done signal are transmitted in a counter method.

9. The display driver IC of claim 1, wherein the control circuit is further configured to transmit a sync done signal after the second synchronization operation is complete, and the sync request signal and the sync done signal are transmitted in a coded command method.

10. The display driver IC of claim 1, wherein the control circuit is configured to monitor the state of the display panel based on at least one of a temperature, a panel leakage, a product variation information, or a driving frame rate of the display panel.

11. The display driver IC of claim 1, wherein the control circuit is further configured to, in the LPM period, transmit a sync pause signal requesting a termination of the frequency signal.

12. A System-on-Chip (SoC) comprising:

a clock generator configured to generate an internal operating clock; and a control circuit configured to generate and output the frame data based on the internal operating clock, wherein the control circuit is further configured to:

transmit first frame data, which is generated based on the internal operating clock, to a display panel, receive a sync request signal from the display panel, and transmit a frequency signal to the display panel based on the internal operating clock, in response to the sync request signal, wherein the sync request signal is received via a side link, wherein the first frame data is transmitted via a main link, and wherein the frequency signal is transmitted via the side link.

13. The SoC of claim 12, wherein the control circuit is further configured to receive one of a sync done signal not terminating a transmission of the frequency signal or a sync pause signal terminating the transmission of the frequency signal from the display panel.

14. A display system comprising:

a System-on-Chip (SoC) configured to:

generate, based on a first internal operating clock, frame data, and output the frame data; and a display panel configured to output, based on a second internal operating clock, an image corresponding to the frame data, wherein the display panel is further configured to, in a frame data update period when an update of the frame data is performed:

receive first frame data from the SoC, perform a first synchronization operation, which synchronizes the second internal operating clock with the first internal operating clock, based on the first frame data, and output the image corresponding to the first frame data, and wherein the display panel is further configured to, in a low power mode (LPM) period when the update of the frame data is not performed:

transmit a sync request signal to the SoC based on a result of monitoring a state of the display panel, receive a frequency signal, which is generated based on the first internal operating clock, from the SoC in response to the sync request signal, and perform a second synchronization operation, which synchronizes the second internal operating clock with the first internal operating clock, based on the frequency signal, wherein the display driver IC is configured to determine a frequency difference has occurred between a panel clock and a processor clock during a first portion of the LPM period, and update a frequency of the panel clock to synchronize with the processor clock during a second portion of the LPM period, and thereby eliminate a flicker in the image at a time of a frame update, wherein the panel clock is the internal operating clock, the processor clock is the frequency signal from the SoC, and the sync request signal is sent based on the determination of the frequency difference.

15. The display system of claim 14, wherein the display panel is a low-temperature polycrystalline oxide (LTPO) panel.

16. The display system of claim 14, wherein the display panel is further configured to:

transmit the sync request signal to the SoC via a low-bandwidth communication link, receive the first frame data from the SoC via a high-bandwidth communication link, and receive the frequency signal from the SoC via the low-bandwidth communication link.

17. The display system of claim 16, wherein the low-bandwidth communication link comprises a first low-bandwidth communication link and a second low-bandwidth communication link that is different from the first low-bandwidth communication link, and wherein the display panel is further configured to:

transmit the sync request signal to the SoC via the first low-bandwidth communication link, receive the first frame data from the SoC via the high-bandwidth communication link, and receive the frequency signal from the SoC via the second low-bandwidth communication link.

* * * * *